(12) United States Patent
Shibuno et al.

(10) Patent No.: US 8,253,823 B2
(45) Date of Patent: Aug. 28, 2012

(54) CAMERA BODY, INTERCHANGEABLE LENS, AND IMAGING APPARATUS

(75) Inventors: Koji Shibuno, Osaka (JP); Takashi Abe, Ehime (JP); Koji Hashigami, Osaka (JP)

(73) Assignee: Panasonic Corporation, Osaka (JP)

( * ) Notice: Subject to any disclaimer, the term of this patent is extended or adjusted under 35 U.S.C. 154(b) by 399 days.

(21) Appl. No.: 12/429,765

(22) Filed: Apr. 24, 2009

(65) Prior Publication Data
US 2009/0268082 A1 Oct. 29, 2009

(30) Foreign Application Priority Data
Apr. 28, 2008 (JP) ................. 2008-116805

(51) Int. Cl.
*H04N 5/76* (2006.01)
*G03B 17/00* (2006.01)
*G03B 13/34* (2006.01)
*G03B 17/24* (2006.01)

(52) U.S. Cl. ........ 348/231.4; 396/86; 396/133; 396/312

(58) Field of Classification Search .................... 396/86, 396/133, 135, 529, 312; 348/360, 375, 231.4
See application file for complete search history.

(56) References Cited

U.S. PATENT DOCUMENTS

| | | | | |
|---|---|---|---|---|
| 5,049,909 | A * | 9/1991 | Ishikawa et al. | 396/406 |
| 5,428,421 | A | 6/1995 | Kawahara et al. | |
| 5,604,560 | A * | 2/1997 | Kaneda | 396/133 |
| 2004/0227837 | A1 | 11/2004 | Ito | |
| 2009/0284612 | A1 * | 11/2009 | Abe et al. | 348/221.1 |

FOREIGN PATENT DOCUMENTS

| | | |
|---|---|---|
| JP | 1-036303 B | 7/1989 |
| JP | 2-257126 A | 10/1990 |
| JP | 4-280236 A | 10/1992 |
| JP | 4-304783 A | 10/1992 |
| JP | 5-091789 A | 4/1993 |
| JP | 9-093484 A | 4/1997 |
| JP | 11-136993 A | 5/1999 |
| JP | 2004-253873 A | 9/2004 |
| JP | 2006-215310 A | 8/2006 |
| JP | 2007-006305 A | 1/2007 |
| JP | 2007-322922 A | 12/2007 |

* cited by examiner

*Primary Examiner* — W. B. Perkey
*Assistant Examiner* — Minh Phan
(74) *Attorney, Agent, or Firm* — Panasonic Patent Center; Dhiren Odedra; Kerry Culpepper (57) ABSTRACT

There are provided a camera body capable of operating a drive unit of an interchangeable lens at a low drive sound level, an interchangeable lens, and an imaging apparatus including such a camera body and an interchangeable lens. The camera body to which an interchangeable lens is mountable, the interchangeable lens including an optical member operable to change an optical condition and a drive unit operable to drive the optical member at a drive speed within a predetermined range, the camera body have: a receiving unit operable to receive silent speed information from the interchangeable lens, the silent speed information indicating a setting value related to a silent operation of the drive unit, the setting value being a value of a drive speed within the predetermined range; and a control unit operable to generate a control signal for driving the drive unit based on the received silent speed information, when attempting to drive the drive unit of the interchangeable lens with a suppressed drive sound of the interchangeable lens, and send the generated control signal to the interchangeable lens.

13 Claims, 8 Drawing Sheets

| | DIAPHRAGM DRIVE SPEED |
|---|---|
| HIGHEST SPEED | 150AV/sec |
| SILENT SPEED | 80AV/sec |
| LOWEST SPEED | 50AV/sec |

CAMERA BODY, INTERCHANGEABLE LENS, AND IMAGING APPARATUS

BACKGROUND

1. Technical Field

The technical field relates to a camera body to which an interchangeable lens is mountable, an interchangeable lens mountable to a camera body, and an imaging apparatus including the camera body and the interchangeable lens.

2. Related Art

In a conventional imaging apparatus, a subject image is formed on a CCD sensor by a lens, image data outputted from the CCD sensor is processed by a signal processing processor, and the resulting image data is displayed on a liquid crystal monitor. At this time, in order to adjust an amount of exposure of the CCD sensor, a CPU connected to the signal processing processor detects brightness of a subject from the image data and controls a diaphragm, according to a result of the detection.

Some conventional imaging apparatuses that include an interchangeable lens and a camera body are capable of shooting both a still image and a moving image, as described in JP-A-9-93484. To obtain an excellent image, it is desirable to make different response speeds for adjustment to the amount of exposure (e.g., a drive speed of a diaphragm for controlling the diaphragm) between when a still image is shot and when a moving image is shot (see paragraphs [0003] to [0005] in JP-A-9-93484). Hence, an imaging apparatus described in JP-A-9-93484 sets a fast response speed for adjusting the amount of exposure of a CCD sensor when shooting a still image, and sets a slow response speed when shooting a moving image. With this configuration, shooting is performed more rapidly when a still image is shot, and a shot image is prevented from jiggling when a moving image is shot. Accordingly, excellent image data is outputted in both cases when a still image is shot and when a moving image is shot.

Some imaging apparatuses are capable of recording audio when shooting a moving image or still image. If, when an imaging apparatus is recording audio, a diaphragm or zoom lens, for example, is driven by a drive unit, then a drive sound of the drive unit is recorded as noise. Hence, it is desirable to suppress the drive sound of the drive unit for driving the diaphragm or the zoom lens to a low level when audio is being recorded.

To solve the above-mentioned problem, an object is therefore to provide a camera body capable of operating a drive unit at a low drive sound level, an interchangeable lens, and an imaging apparatus including such a camera body and an interchangeable lens.

SUMMARY

A camera body according to one aspect is a camera body to which an interchangeable lens is mountable. The interchangeable lens includes an optical member operable to change an optical condition and a drive unit operable to drive the optical member at a drive speed within a predetermined range. The camera body includes: a receiving unit operable to receive silent speed information from the interchangeable lens, the silent speed information indicating a setting value or an allowable setting range related to a silent operation of the drive unit, the setting value and the allowable setting range being a value and a range of the drive speed within the predetermined range, respectively; and a controller operable to generate a control signal for driving the drive unit based on the received silent speed information and send the generated control signal to the interchangeable lens for driving the drive unit at a low sound level.

The drive unit may be driven at the low drive sound level when the camera body is performing an audio recording operation.

The drive unit may be driven at the low sound level when the camera body is set to a silent mode which is an operation mode where a drive sound of the drive unit is desired to be at a low level.

The setting value related to the silent operation of the drive unit may be a value of the drive speed at which the drive sound level is less than both drive sound levels of the drive unit generated when driving the optical member at a maximum value and a minimum value of drive speeds within the predetermined range, respectively.

The receiving unit may receive highest-speed information indicating a highest speed operation of the drive unit and lowest-speed information indicating a lowest speed operation of the drive unit. The controller may generate control signals for driving the drive unit based on the received highest-speed information and lowest-speed information, and send the generated control signals to the interchangeable lens for driving the drive unit at the highest speed operation and the lowest speed operation.

The setting value or allowable setting range related to the silent speed operation of the drive unit may be between setting values or allowable setting ranges of the highest speed operation and lowest speed operation of the drive unit.

An interchangeable lens according to another aspect is an interchangeable lens mountable to a camera body, and the interchangeable lens includes: an optical member operable to change an optical condition; a drive unit operable to drive the optical member at a drive speed within a predetermined range; a storage unit operable to store silent speed information indicating a setting value or an allowable setting range related to a silent operation of the drive unit, the setting value and the allowable setting range being a value and a range of the drive speed within the predetermined range, respectively; and a sending unit operable to read the silent speed information stored in the storage unit and send the silent speed information to the camera body; and a controller operable to receive from the camera body a control signal for driving the drive unit which is generated according to the silent speed information, and control the drive unit according to the received control signal.

The optical member may include at least one of a zoom lens, a focus lens, or a diaphragm.

The setting value related to the silent operation of the drive unit may be a value of the drive speed at which a drive sound level is less than both of drive sound levels of the drive unit generated when driving the optical member is driven at a maximum value and a minimum value of drive speeds within the predetermined range, respectively.

An imaging apparatus according to the other aspect includes the above-described camera body and the above-described interchangeable lens mountable to the camera body.

According to the above configurations, silent speed information indicating a setting value or an allowable setting range related to a silent operation of a drive unit of an interchangeable lens (e.g., a drive unit that drives at least one of a diaphragm, a focus, and a zoom) is stored in the interchangeable lens. When the interchangeable lens is mounted on a camera body, the silent speed information is sent from the interchangeable lens to the camera body. The camera body controls the drive unit of the interchangeable lens based on the silent speed information. Thereby the drive unit can be operated at a low drive sound level.

DETAILED DESCRIPTION OF THE PREFERRED EMBODIMENTS

An embodiment will be described below with reference to the accompanying drawings. In the present embodiment, an imaging apparatus is explained as a digital single-lens camera (hereinafter, simply referred to as the "digital camera"). In the digital camera according to the present embodiment, silent speed information is sent to a camera body from an interchangeable lens when the interchangeable lens is mounted to the camera body. Thus, the digital camera enables that a drive unit of the interchangeable lens is operated at a low drive sound level during audio recording of the camera body. In this embodiment, "silent speed information" means a setting value (specifically, a speed) related to silent operation when driving a diaphragm drive unit for driving a diaphragm.

1. Configuration 1-1 Overall Configuration

Figure 1:
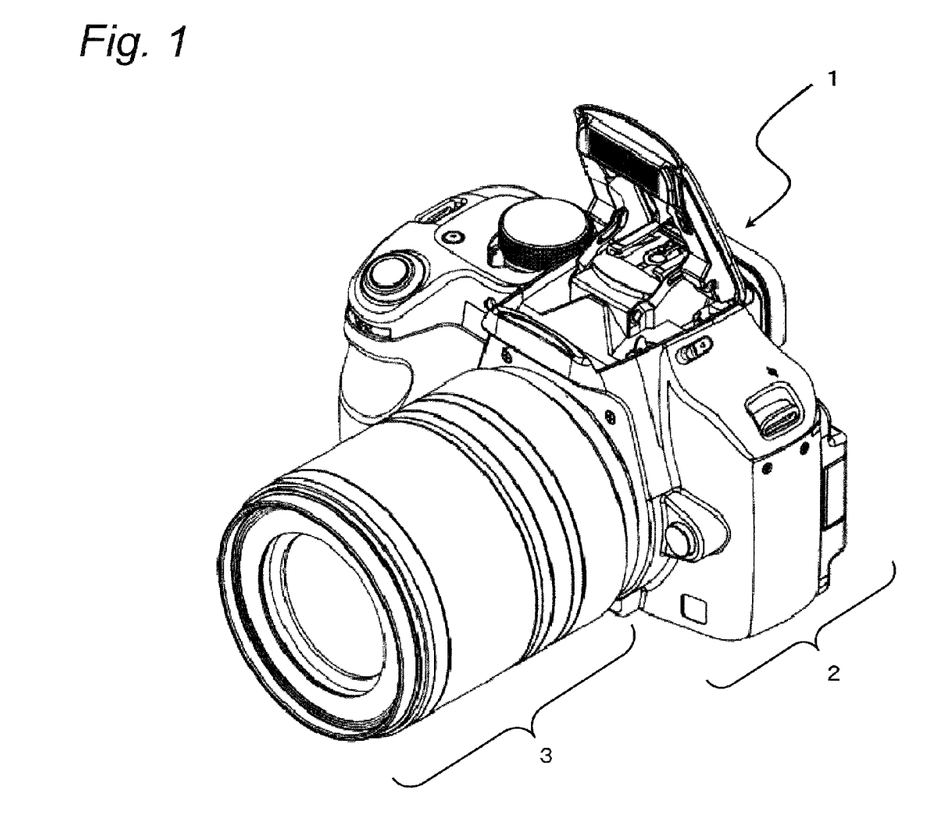
FIG. 1 is a perspective view of a digital camera according to an embodiment.

FIG. 1 is a perspective view of a digital camera according to an embodiment. The digital camera 1 according to the embodiment includes a camera body 2 and an interchangeable lens 3 mountable to the camera body 2. The camera body 2 captures a subject image where light is collected by an optical system of the interchangeable lens 3 to generate the captured subject image as image data.

1-2 Configuration of Camera Body

Figure 2:
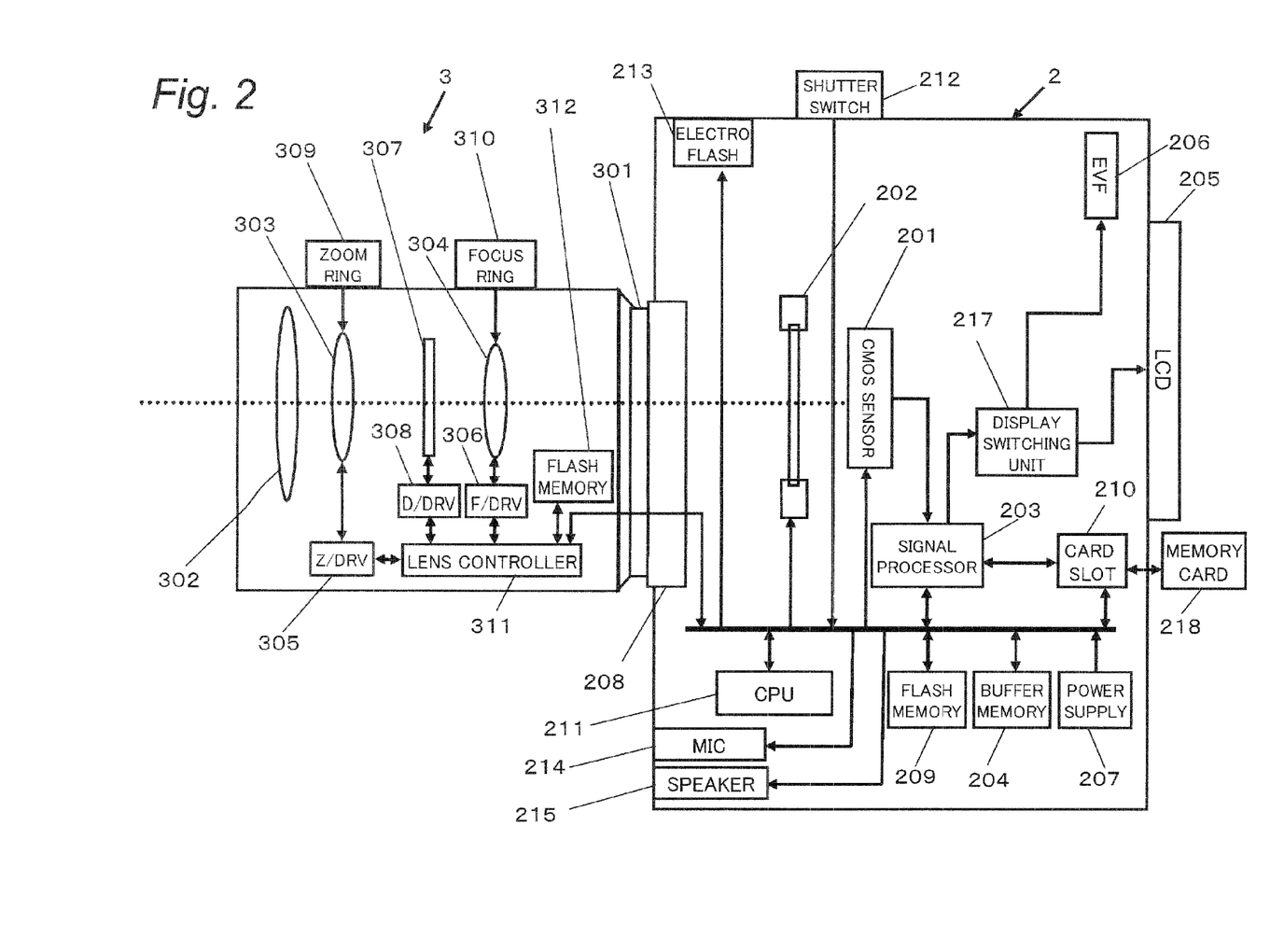
FIG. 2 is a block diagram showing a configuration of the digital camera according to the embodiment.

FIG. 2 is a block diagram showing a specific configuration of the digital camera 1 in FIG. 1. The camera body 2 includes a CMOS sensor 201, a shutter 202, a signal processing processor 203 (DSP), a buffer memory 204, a liquid crystal monitor 205, an electronic viewfinder 206 (EVF), a power supply 207, a body mount 208, a flash memory 209, a card slot 210, a CPU 211, a shutter switch 212, an electronic flash 213, a microphone 214, and a speaker 215.

The CMOS sensor 201 is an imaging unit that captures a subject image to generate image data (a digital signal or electrical signal). The CMOS sensor 201 includes a light-receiving element, an AGC (gain control amplifier), and an AD converter. The light-receiving element converts an optical signal obtained by collecting light by the optical system of the interchangeable lens 3, into an electrical signal. The AGC amplifies the electrical signal outputted from the light-receiving element. The AD converter converts the electrical signal outputted from the AGC into a digital signal.

The CMOS sensor 201 performs various operations such as exposure, transfer, and an electronic shutter operation, according to a control signal sent from the CPU 211. The various operations can be implemented by a built-in timing generator, and so on. An electronic shutter adjusts the light-receiving time (capturing time) per frame of the light-receiving element.

The mechanical shutter 202 switches between cutoff and transmission of an optical signal to the CMOS sensor 201, which enters through the optical system of the interchangeable lens 3. The mechanical shutter 202 opens and closes to temporally adjust the amount of light incident on the CMOS sensor 201. The mechanical shutter 202 is driven by a mechanical shutter drive unit (not shown). The mechanical shutter drive unit is configured by electromechanical components such as a motor and a spring, and drives the mechanical shutter 202 according to control by the CPU 211.

The signal processing processor (DSP) 203 performs an image processing on image data which is converted into a digital signal by the AD converter. The image processing includes gamma conversion, YC conversion, an electronic zoom process, a compression process, a decompression process, and so on.

The buffer memory 204 acts as a work memory. For example, the buffer memory 204 acts as a work memory when the signal processing processor 203 performs a process or when the CPU 211 performs a control process. The buffer memory 204 can be realized by means of, for example, a DRAM.

The liquid crystal monitor 205 is disposed on the back of the camera body 2 and displays image data generated by the CMOS sensor 201 or image data obtained by performing a image process on the image data. An image signal to be inputted to the liquid crystal monitor 205 is converted from a digital signal into an analog signal by a DA converter when outputted from the signal processing processor 203 to the liquid crystal monitor 205.

The electronic viewfinder 206 is disposed in the camera body 2 and displays image data generated by the CMOS sensor 201 or image data obtained by performing a image process on the image data. An image signal to be inputted to the electronic viewfinder 206 is also similarly converted from a digital signal into an analog signal by the DA converter when outputted from the signal processing processor 203 to the electronic viewfinder 206.

A display switching unit 217 switches display of an image signal between the liquid crystal monitor 205 and the electronic viewfinder 206. That is, while an image is displayed on the liquid crystal monitor 205, nothing is displayed in the electronic viewfinder 206. While an image is displayed in the electronic viewfinder 206, nothing is displayed on the liquid crystal monitor 205. The display switching unit 217 can be implemented by a physical structure such as a switching switch. In this case, for example, when the switching switch is switched with the signal processing processor 203 and the liquid crystal monitor 205 being electrically connected to each other, the electrical connection between the signal processing processor 203 and the liquid crystal monitor 205 is disconnected and the signal processing processor 203 and the electronic viewfinder 206 are electrically connected to each other. Note that the display switching unit 217 is not limited to a switching switch and can be any as long as it can switch display between the liquid crystal monitor 205 and the electronic viewfinder 206, based on a control signal from the CPU 211. Note also that although in the present embodiment switching is performed between display on the liquid crystal monitor 205 and display in the electronic viewfinder 206, display on the liquid crystal monitor 205 and display in the electronic viewfinder 206 may be simultaneously performed. In the case of simultaneous display, an image displayed on the liquid crystal monitor 205 and an image displayed in the electronic viewfinder 206 may be the same or may be different.

The power supply 207 supplies power to be consumed by the digital camera 1. The power supply 207 may be, for example, a dry cell battery or rechargeable battery. Alternatively, the power supply 207 may supply power supplied from an external source through a power cord, to the digital camera 1.

The body mount 208 is a member that allows attachment and detachment of the interchangeable lens 3 through a lens mount 301 of the interchangeable lens 3. For example, the body mount 208 can be electrically connected to the interchangeable lens 3 by a connection terminal and so on, and can be mechanically connected to the interchangeable lens 3 by a mechanical member such as an engaging member. The body mount 208 outputs a signal from a lens controller 311 of the interchangeable lens 3 to the CPU 211 and outputs a signal from the CPU 211 to the lens controller 311 of the interchangeable lens 3.

The flash memory 209 is a storage medium used as a built-in memory. The flash memory 209 stores image data or image data obtained by performing an image process on the image data and/or a digitized audio signal. The flash memory 209 can further store programs, setting values, and so on, for control by the CPU 211. The flash memory 209 stores drive speed information (including silent speed information) sent by the interchangeable lens 3. That is, CPU 211 stores, in the flash memory 209, the drive speed information received from the interchangeable lens 3. Further, an aperture value is stored in the flash memory 209. That is, the aperture value set by the user operating an operation member (not shown) which is provided to the camera body 2 and with which the aperture value of the interchange lens 3 can be adjusted, is stored in the flash memory 209.

The card slot 210 is a slot for allowing a memory card 218 to be inserted therein or removed therefrom. The memory card 218 is a storage medium that stores image data or image data obtained by performing an image process on the image data and/or a digitized audio signal.

The CPU 211 controls the entire camera body 2. Also, the CPU 211 performs sending and receiving of a control signal, information on the optical system, and so on, with the lens controller 311 on the side of the interchangeable lens 3. The CPU 211 may be implemented by a microcomputer or may be implemented by a hard-wired circuit.

The shutter switch 212 is a button provided on a topside of the camera body 2 and is an operation unit that detects half-press (pressed halfway) and full-press (pressed fully) operations by the user. When the shutter switch 212 accepts a half-press operation from the user, the shutter switch 212 outputs a half-press signal to the CPU 211. On the other hand, when the shutter switch 212 accepts a full-press operation from the user, the shutter switch 212 outputs a full-press signal to the CPU 211. Based on these signals, the CPU 211 performs various controls.

The electronic flash 213 irradiates light to a subject, based on a control signal from the CPU 211. For example, the electronic flash 213 can be implemented using a xenon lamp, a capacitor, and so on. In the case of this configuration, the electronic flash 213 irradiates light by accumulating high-voltage charge in the capacitor and applying the charge to an electrode of the xenon lamp.

The microphone 214 converts audio into an electrical signal. The electrical signal outputted from the microphone 214 is converted into a digital signal by the AD converter. The digital signal converted by the AD converter is stored in the flash memory 209 or the memory card 218, according to control by the CPU 211.

The speaker 215 converts an electrical signal into audio. An electrical signal to be inputted to the speaker 215 is a signal that is converted from a digital signal into an electrical signal by the DA converter. To the DA converter, a digital signal read from the flash memory 209 or the memory card 218 is inputted according to control by the CPU 211.

1-3 Configuration of Interchangeable Lens

The interchangeable lens 3 includes a lens mount 301, an objective lens 302, a zoom lens 303, a focus lens 304, a zoom drive unit 305 that drives the zoom lens 303, a focus drive unit 306 that drives the focus lens 304, a diaphragm 307, a diaphragm drive unit 308 that drives the diaphragm 307, a zoom ring 309, a focus ring 310, a lens controller 311, and a flash memory 312. The zoom drive unit 305, the focus drive unit 306, and the diaphragm drive unit 308 make up a drive unit operable to change the optical conditions of light passing through the interchangeable lens 3.

An optical system of the interchangeable lens 3 includes the objective lens 302, the zoom lens 303, and the focus lens 304 and collects light from a subject. The zoom drive unit 305 drives the zoom lens 303, according to control by the lens controller 311. The focus drive unit 306 drives the focus lens 304, according to control by the lens controller 311. The zoom ring 309 is provided on the exterior of the interchangeable lens 3 and drives the zoom lens 303, according to an operation performed by the user. The focus ring 310 is provided on the exterior of the interchangeable lens 3 and drives the focus lens 304, according to an operation performed by the user. The zoom lens 303 is driven by the zoom drive unit 305 or the zoom ring 309 to adjust the zoom magnification. The focus lens 304 is driven by the focus drive unit 306 or the focus ring 310 to adjust the focus. The zoom lens 303 and the focus lens 304 are movable lenses.

The diaphragm 307 adjusts the amount of light passing through the optical system. An adjustment to the amount of light is made by increasing or decreasing an aperture formed by five blades, for example. The diaphragm drive unit 308 changes the size of the aperture of the diaphragm 307. The size of the aperture can be specified by an aperture value (a F-number). In this embodiment, the diaphragm drive unit 308 receives a control signal (including the aperture value and the drive speed) for controlling the diaphragm drive unit 308 from the les controller 311, and adjusts the aperture of the diaphragm 307 based on the received control signal. The method of changing the speed of driving the diaphragm 307 (the drive speed of the diaphragm drive unit 308) is not limited. The changing is performed, for example, by changing a current to a motor driving the diaphragm 307. Note that although the diaphragm drive unit 308 drives the diaphragm 307 based on control by the lens controller 311, the configuration is not limited thereto and the diaphragm 307 may be driven by a mechanical method. In this case, an interlocking pin is provided to the body mount 208 and the diaphragm drive unit 308 drives the diaphragm 307 responsive to drive of the interlocking pin. The interlocking pin is driven by a motor and the like controlled by the CPU 211.

The flash memory 312 stores drive speed information of the diaphragm drive unit 308 (described in detail later with FIG. 3).

The lens controller 311 controls the entire interchangeable lens 3. The lens controller 311 may be implemented by a microcomputer or may be implemented by a hard-wired circuit. The lens controller 311 reads the drive speed information in the flash memory 312 when the interchangeable lens 3 is mounted to the camera body 2, and sends the drive speed information to the camera body 2. The lens controller 311 obtains the control signal for controlling the drive unit sent by the camera body 2 and outputs the obtained control signal to the drive unit 305, 306, and 308.

Figure 3:
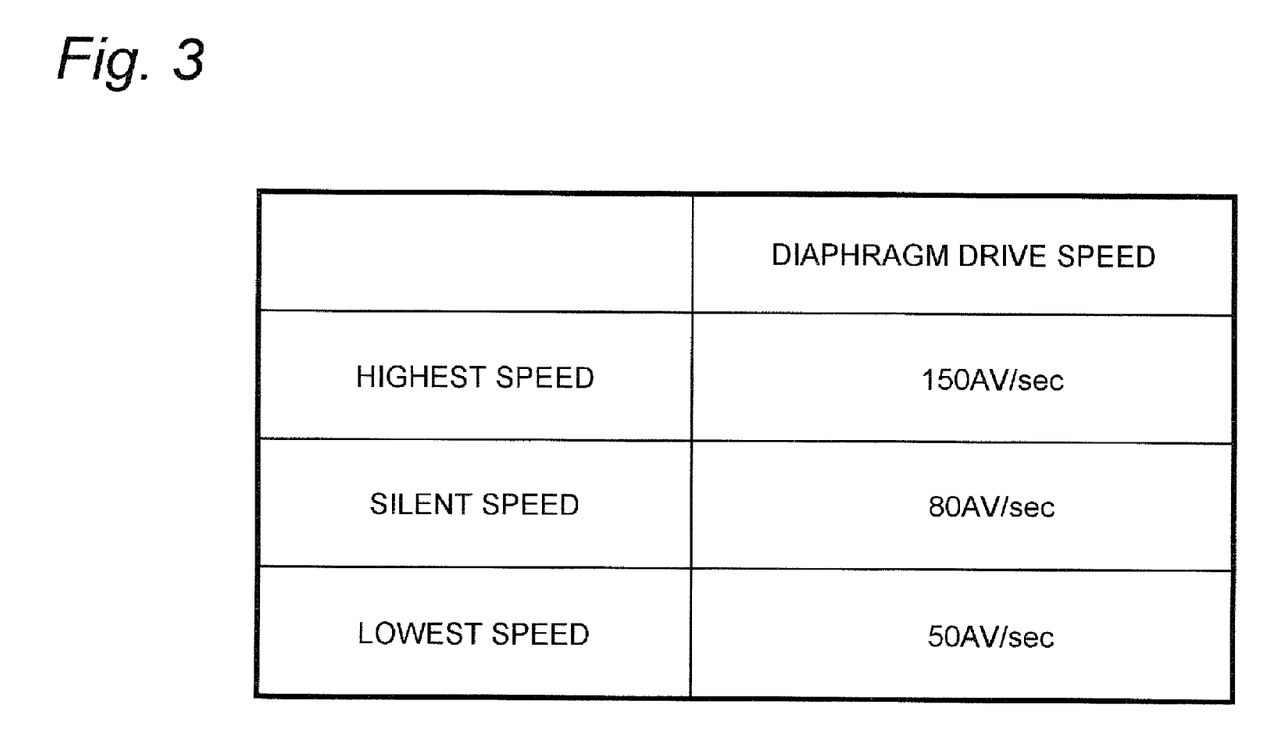
FIG. 3 is a diagram showing drive speed information of the digital camera according to the embodiment.

FIG. 3 shows an example of drive speed information which indicates the drive speeds of the diaphragm drive unit 308 (the speeds used when the diaphragm 307 is driven) and is stored in the flash memory 312 of the interchangeable lens 3. The drive speed information of the diaphragm drive unit 308 includes setting value information (highest-speed information) indicating a setting value related to the highest speed, setting value information (lowest-speed information) indicating a setting value related to the lowest speed, and setting value information (silent speed information) indicating a setting value related to a silent speed, which are within a drive speed setting range of the diaphragm drive unit 308. The "silent speed" refers to the drive speed of the diaphragm drive unit 308 that is used to operate the diaphragm drive unit 308 of the interchangeable lens 3 at a desired low drive sound level (which will be described below in detail with FIG. 4). In the present embodiment, the setting values related to the highest speed, the lowest speed, and the silent speed indicate their respective speeds. That is, the highest-speed information, the lowest-speed information, and the silent speed information respectively indicate the highest speed, the lowest speed, and the silent speed. In FIG. 3, the highest-speed information is 150 AV/sec, the lowest-speed information is 50 AV/sec, and the silent speed information is 80 AV/sec.

Figure 4:
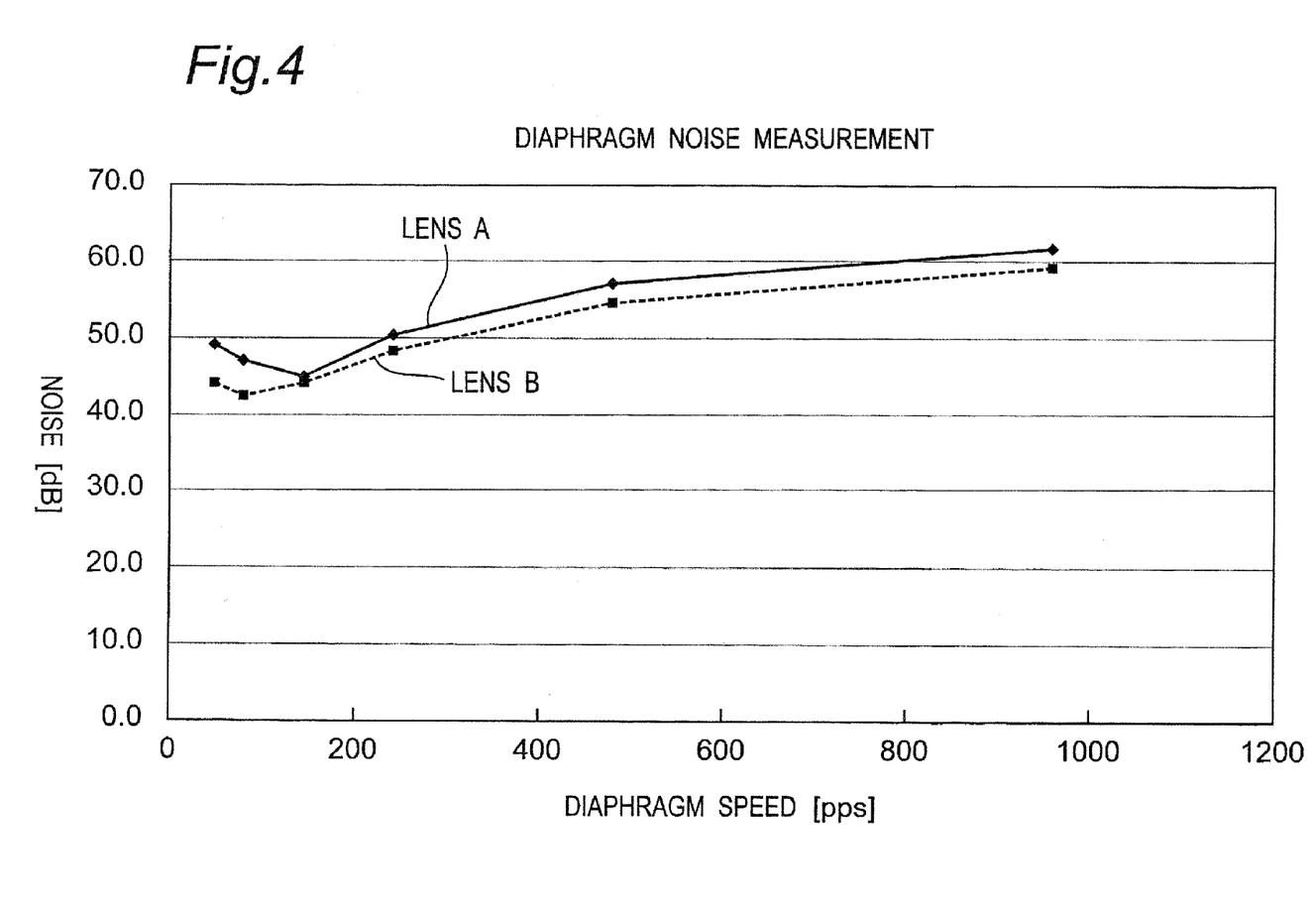
FIG. 4 is a diagram for describing a silent speed of the digital camera according to the embodiment.

With reference to FIG. 4, the silent speed will further be described. FIG. 4 is a diagram showing relationships between the drive speed and drive sound (noise) of the diaphragm drive unit 308 for two types of interchangeable lenses A and B. In FIG. 4, a horizontal axis represents the speed (pps) at which the diaphragm drive unit 308 drives the diaphragm 307 and a vertical axis represents the noise (dB) of the diaphragm drive unit 308. The diaphragm drive unit 308 is configured by a stepping motor, a servo motor, and the like. Thus, as shown in FIG. 4, due to configurations and characteristics of the motors, the lowest speed is not always a speed at which the drive sound level is lowest. Hence, in the present embodiment, information about a speed (silent speed information) at which the interchangeable lens 3 can be driven more quietly is stored in the interchangeable lens 3. As shown by the characteristics of the interchangeable lenses A and B in FIG. 4, the silent speed varies depending on the type of the interchangeable lens 3. Accordingly, the interchangeable lens 3 stores its unique silent speed information. The camera body 2 can drive (silent operate) the interchangeable lens 3 quietly by referring to the silent speed information.

For example, the "silent speed" can be defined as a drive speed which provides the driving of the diaphragm drive unit 308 with a level of drive sound that is equal to or lower than a lower one of levels of drive sounds generated when the diaphragm 307 is driven by the diaphragm drive unit 308 at the highest speed and at the lowest speed. Information on one of such drive speeds may be stored in the flash memory 312 of the interchangeable lens 3.

Note that in the following description a speed of the diaphragm drive unit 308 at which the drive sound level is lowest is set as the silent speed.

Figure 5:
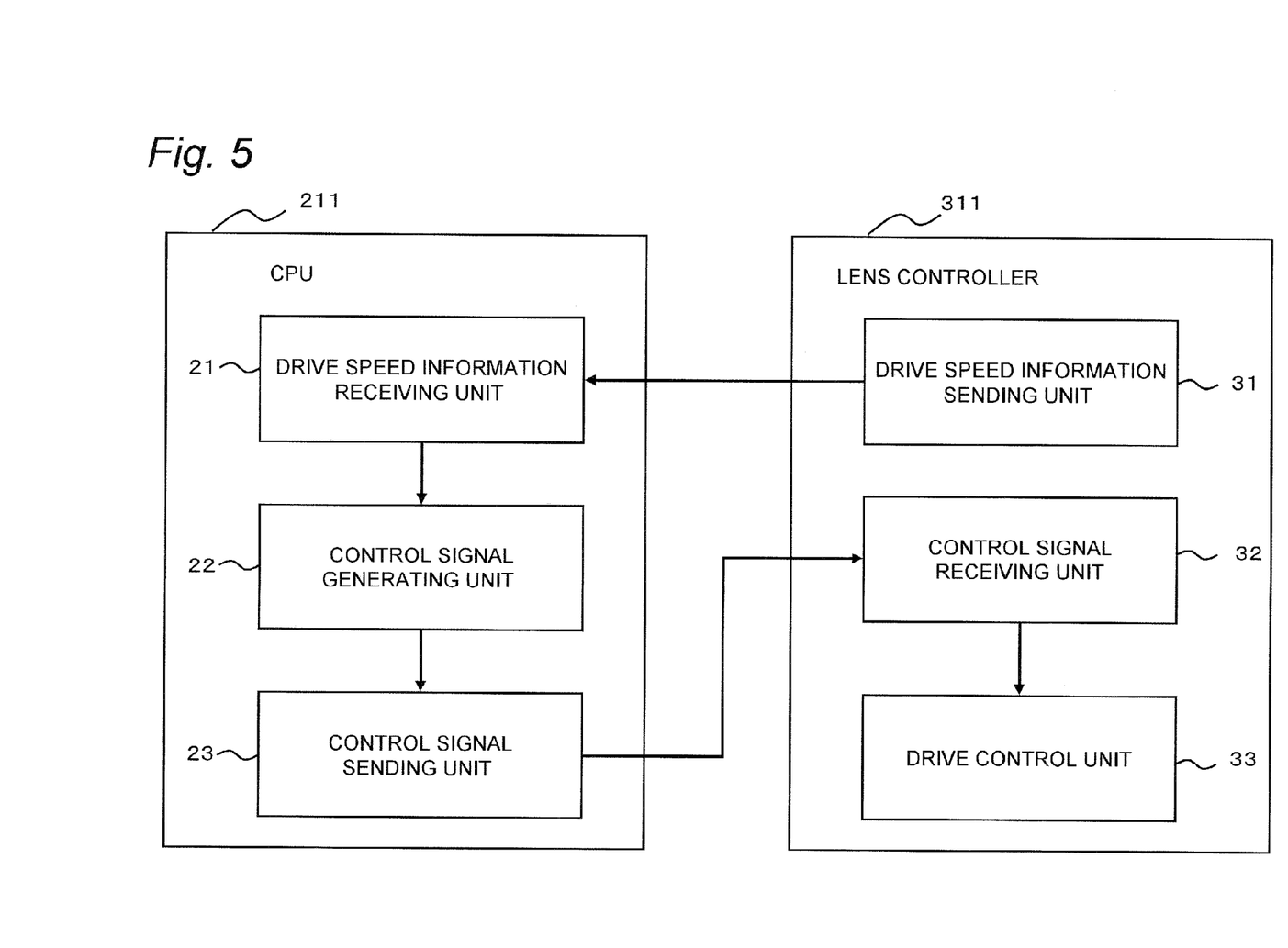
FIG. 5 is a functional diagram showing specific configurations of a CPU of a camera body and a lens controller of an interchangeable lens according to the embodiment.

FIG. 5 is a functional diagram showing specific configurations of the CPU 211 of the camera body 2 and the lens controller 311 of the interchangeable lens 3. The CPU 211 of the camera body 2 includes a drive speed information receiving unit 21 that receives, from the interchangeable lens 3, drive speed information of the diaphragm drive unit 308 of the interchangeable lens 3, such as that shown in FIG. 3; a control signal generating unit 22 that generates a control signal for controlling the diaphragm drive unit 308 of the interchangeable lens 3, based on the received drive speed information; and a control signal sending unit 23 that sends the generated control signal to the interchangeable lens 3. The lens controller 311 of the interchangeable lens 3 includes a drive speed information sending unit 31 that sends drive speed information of the diaphragm drive unit 308, such as that shown in FIG. 3, stored in the flash memory 312; a control signal receiving unit 32 that receives a control signal sent from the camera body 2; and a drive control unit 33 that controls the diaphragm drive unit 308, based on the received control signal.

2. Operation

An operation of the digital camera 1 configured as above that is performed to reduce the drive sound of the diaphragm drive unit 308 will be described below.

Figure 6:
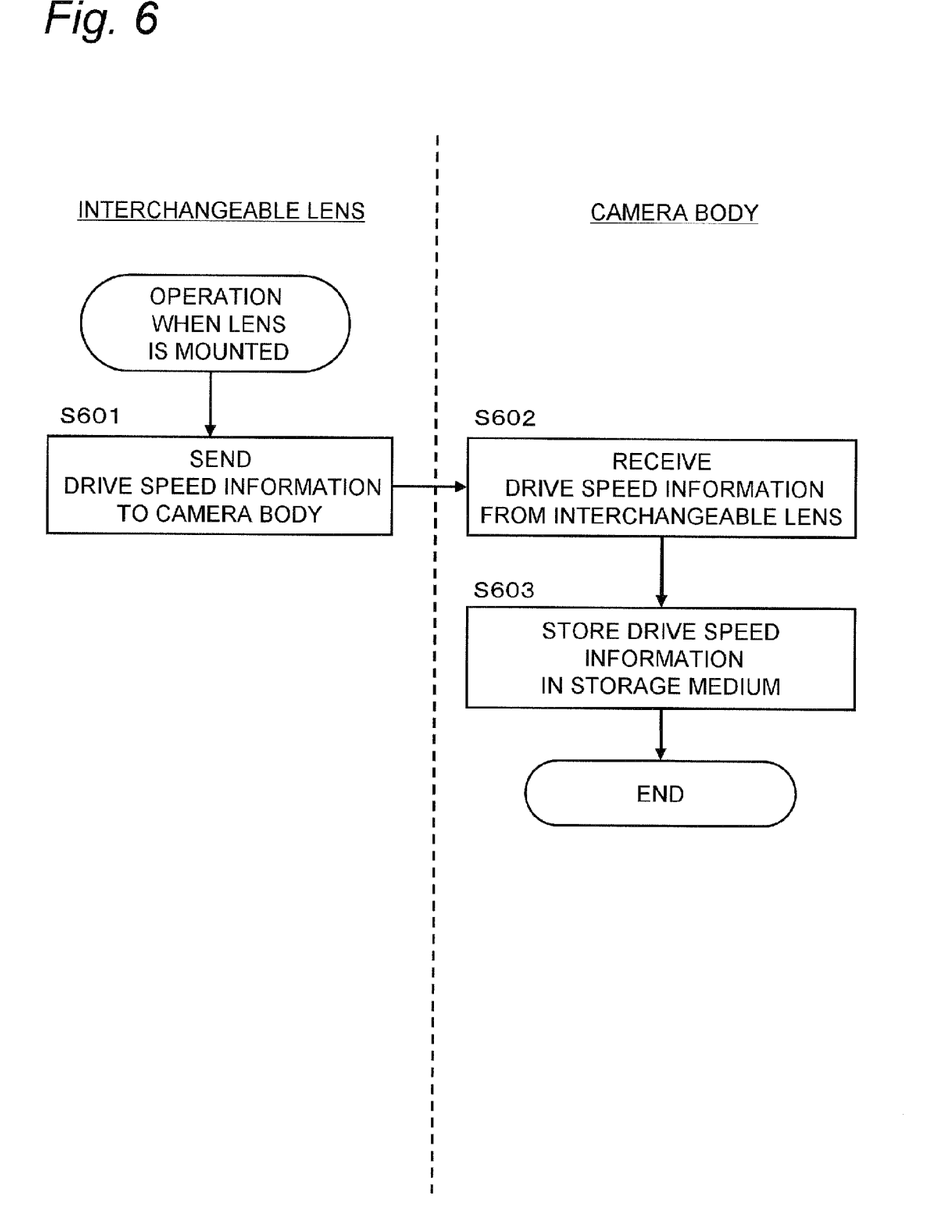
FIG. 6 is a flowchart showing operations of the camera body and the interchangeable lens performed upon mounting the interchangeable lens, according to the embodiment.
Figure 7:
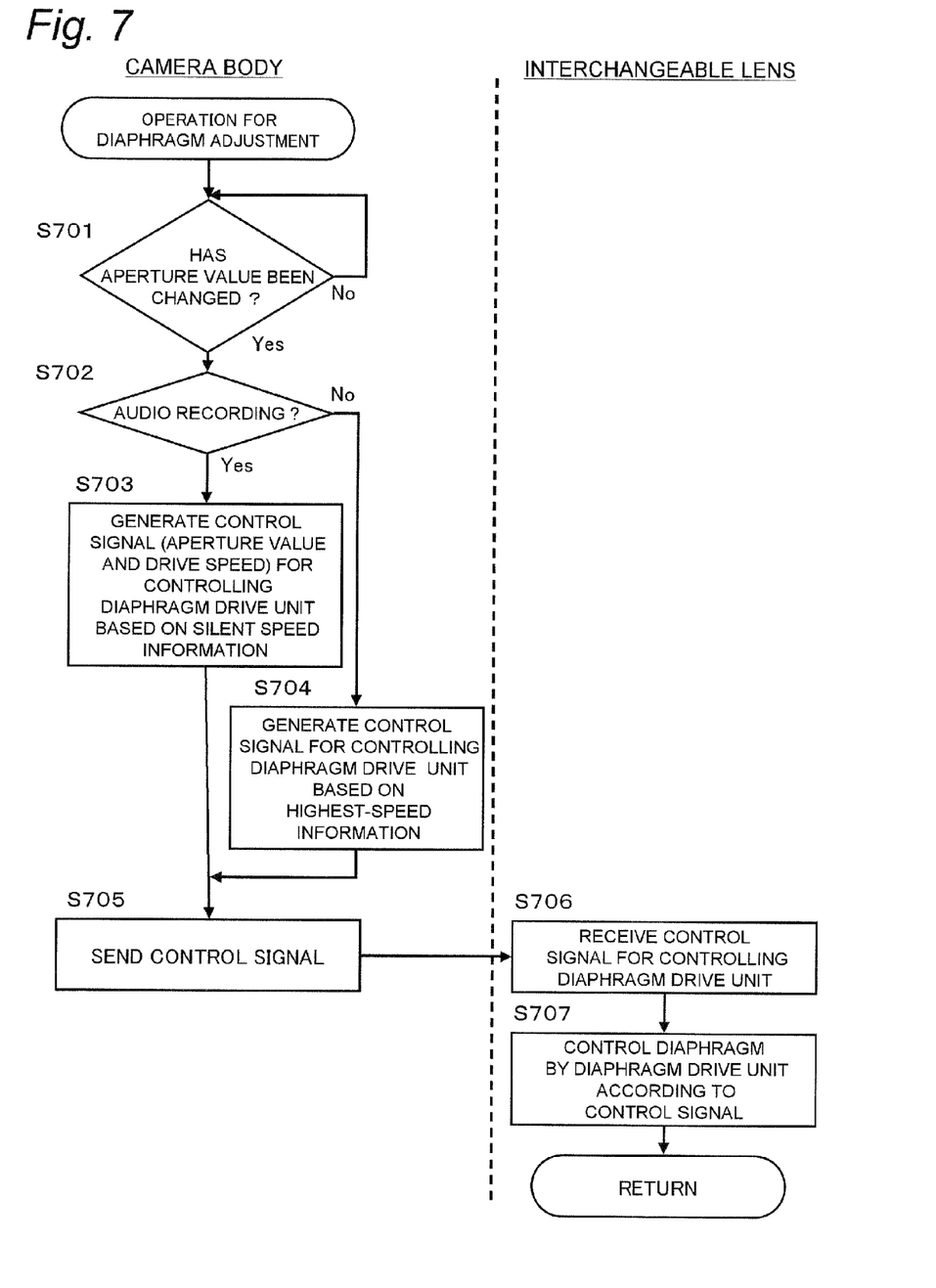
FIG. 7 is a flowchart showing the operations of the camera body and the interchangeable lens performed upon adjusting a diaphragm, according to the embodiment.
Figure 8:
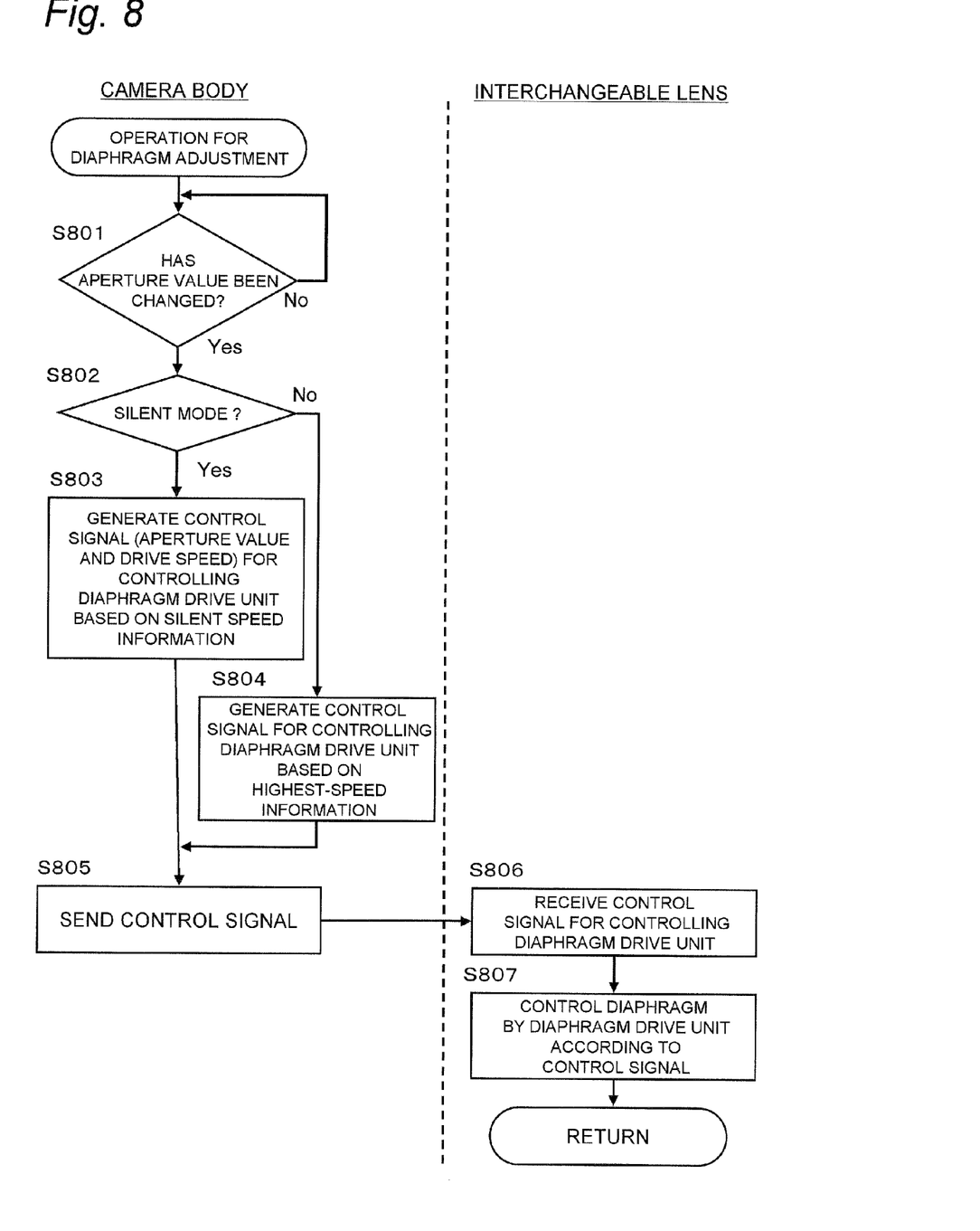
FIG. 8 is a flowchart showing the operations of the camera body and the interchangeable lens performed upon adjusting the diaphragm, according to the embodiment.

FIGS. 6 to 8 show the operations of the camera body 2 and the interchangeable lens 3 which configure the digital camera 1 according to the present embodiment. FIG. 6 shows the operations of the lens controller 311 of the interchangeable lens 3 and the CPU 211 of the camera body 2 performed when the interchangeable lens 3 is mounted on the camera body 2. When the interchangeable lens 3 is mounted on the camera body 2, the lens controller 311 of the interchangeable lens 3 sends the camera body 2 drive speed information including at least silent speed information (see FIG. 3) (S601). The CPU 211 of the camera body 2 receives the drive speed information sent from the interchangeable lens 3 (S602) and stores the received drive speed information in the flash memory 209 which is a storage medium (S603).

FIGS. 7 and 8 show the operations of the lens controller 311 of the interchangeable lens 3 and the CPU 211 of the camera body 2 performed when diaphragm adjustment is made after the process shown in FIG. 6.

FIG. 7 shows the case of changing the drive speed of the diaphragm drive unit 308, based on whether the camera body 2 is in the process of audio recording. The CPU 211 of the camera body 2 determines whether an aperture value has been changed (S701). A change to the aperture value is made by a user or the CPU 211 of the camera body 2. For example, the CPU 211 detects that the user has operated an operation member provided to the camera body 2, and thereby accepts a change to the aperture value. Alternatively, when the CPU 211 detects brightness of a subject from image data generated by the CMOS sensor 201 and determines, based on a result of the detection, that the aperture value needs to be changed, the aperture value is changed. The case in which the aperture value needs to be changed indicates, for example, the case in which the brightness of a subject is darkened to a predetermined level or more.

If an aperture value has been changed (Yes in S701), then the CPU 211 of the camera body 2 determines whether the camera body 2 is in the process of audio recording (S702). Now, "audio recording" will be described. Audio recording includes recording sound during moving-image shooting, recording sound which is added to a still image, and recording sound only. Audio recording during moving-image shooting is performed, for example, in the manner described below. When the camera body 2 is set to a "moving-image shooting with audio" mode and moving-image shooting has started by operating the shutter switch 212, audio recording starts on the camera body 2. When audio recording starts, the CPU 211 stores audio data obtained by the microphone 214 in the memory card 218. Thereafter, when the moving-image shooting has ended by operating the shutter switch 212 during the moving-image shooting, the audio recording ends. Note that an audio recording method is not limited to the above method.

If the CPU 211 determines that the camera body 2 is in the process of audio recording (Yes in S702), then the CPU 211 generates a control signal for controlling the diaphragm drive unit 308, based on silent speed information stored in the flash memory 209 (S703). The control signal for controlling the diaphragm drive unit 308 includes an aperture value (f-number) and a drive speed of the diaphragm drive unit 308. In the case of FIG. 3, the setting value (80 AV/sec) included in the silent speed information is included in the control signal, as the drive speed of the diaphragm drive unit 308. This enables the camera body 2 to control the diaphragm drive unit 308, taking more account of the drive sound.

On the other hand, if the CPU 211 of the camera body 2 determines that the camera body 2 is not in the process of audio recording (No in S702), then the CPU 211 generates a control signal for controlling the diaphragm drive unit 308, based on highest-speed information stored in the flash memory 209 (S704). By causing the diaphragm drive unit 308 to drive at the highest speed, the diaphragm 307 can be set to a desired state more rapidly. Note that a control signal for controlling the diaphragm drive unit 308 may be generated based on lowest-speed information. The CPU 211 of the camera body 2 sends the generated control signal to the interchangeable lens 3 (S705).

The lens controller 311 of the interchangeable lens 3 receives the control signal for controlling the diaphragm drive unit 308 sent from the camera body 2 (S706). The lens controller 311 controls the diaphragm drive unit 308, according to the received control signal for controlling the diaphragm drive unit 308 (S707). Specifically, the diaphragm drive unit 308 drives the diaphragm 307 at a drive speed controlled by the lens controller 311, to obtain an aperture value controlled by the lens controller 311.

FIG. 8 shows the case of changing the drive speed of the diaphragm drive unit 308, based on whether the camera body 2 is in a silent mode. The difference between FIGS. 7 and 8 is that it is determined whether the camera body 2 is set to a silent mode (S802), instead of determining whether the camera body 2 is in the process of audio recording (S702). All other steps are the same between FIGS. 7 and 8. As used herein, the "silent mode" is an operation mode where the drive sound of the diaphragm drive unit 308 of the digital camera 1 is suppressed to a low level. The silent mode is set, for example, in the manner described below. A button dedicated to specifying the silent mode is provided to the camera body 2. The user can set the silent mode on the camera body 2 by operating the dedicated button. By this operation, the camera body 2 can perform control with the drive sound of the diaphragm drive unit 308 being suppressed. Note that when various other operation modes than the silent mode are provided to the camera body 2, switching between the silent mode and the other operation modes may be performed by switching between dedicated buttons provided to the camera body 2. Alternatively, the operation modes may be switched in a manner such that a screen for switching between the operation modes is displayed on the liquid crystal monitor 205 and the user operates an operation member as he watches the screen.

If the camera body 2 is set to a silent mode at step S802, then the CPU 211 generates a control signal for controlling the diaphragm drive unit 308, based on silent speed information stored in the flash memory 209 (S803). On the other hand, if the camera body 2 is not set to a silent mode, then the CPU 211 generates a control signal for controlling the diaphragm drive unit 308, based on highest-speed information stored in the flash memory 209 (S804). With such a configuration, when the silent mode is set, the drive sound of the interchangeable lens 3 can be reduced.

3. Conclusions

According to the embodiment, the interchangeable lens 3 holds silent speed information indicating a setting value related to a silent operation of the diaphragm drive unit 308. When the interchangeable lens 3 is mounted on the camera body 2, the silent speed information is sent from the interchangeable lens 3 to the camera body 2. Thus, during audio recording or a silent mode, the camera body 2 can control the diaphragm drive unit 308 of the interchangeable lens 3, based on the silent speed information of the interchangeable lens 3. Accordingly, the drive of the interchangeable lens 3 with the drive sound of the interchangeable lens 3 being reduced is enabled. By this, inclusion of noise in audio data to be recorded can be reduced.

4. Other embodiments

Although the above embodiment describes the case of controlling the diaphragm drive unit 308 based on silent speed information, the target of control based on silent speed information is not limited to the diaphragm drive unit 308. A drive unit (e.g., the focus drive unit 306 or the zoom drive unit 305) that drives an optical member (e.g., the focus lens 304 or the zoom lens 303) that changes an optical condition in the interchangeable lens 3 may be controlled based on the respective silent speed information. Alternatively, an OIS drive unit may be controlled based on the silent speed information thereof.

Note that the above-described embodiment shows an example in which the silent speed is a speed at which the drive sound level of the diaphragm drive unit 308 is lowest. However, the setting value at which the drive sound level of the drive unit is lowest does not strictly need to be a speed at which the drive sound level is the lowest. That is, the camera body 2 should get knowledge from the interchangeable lens 3 about at roughly what drive speed the drive sound of the drive unit can be suppressed to a low level. Thus, the setting value at which the drive sound level of the drive unit is lowest may be normally a setting value at which the user can feel that the drive sound level is lower than those obtained at other speeds when the drive unit is driven at the setting value.

The silent speed may be set by taking account of not only the drive sound of the diaphragm drive unit 308 but also other requirements (e.g., image quality).

Although, in the above-described embodiment, at step S703 in FIG. 7 and step S803 in FIG. 8, a silent speed is used as a drive speed included in a control signal for controlling the diaphragm drive unit 308, the drive speed included in the control signal is not limited thereto and any other speed than the silent speed may be used. For example, an intermediate speed between the silent speed and the lowest speed may be used. When the camera body 2 is shooting a moving image with audio, the camera body 2 may control the drive speed of the diaphragm drive unit 308 to be slower, taking account of not only drive sound but also moving image reproduction. For the "moving image reproduction", by slowing the drive speed of the drive unit, the change between plural pieces of image data that are sequentially outputted from the CMOS sensor 201 can be made smaller and thus a smooth moving image can be provided to the user. In such a case, by generating, based on silent speed information and lowest-speed information, a control signal for driving the diaphragm drive unit 308 that includes an intermediate speed between the silent speed and the lowest speed, control taking account of moving image reproduction and the drive sound of the diaphragm drive unit 308 can be performed. In the case of FIG. 3, an intermediate speed (65 AV/sec) between the silent speed (80 AV/sec) and the lowest speed (50 AV/sec) serves as a drive speed for controlling the diaphragm drive unit 308.

Although, in the above-described embodiment, upon audio recording or in a silent mode, the diaphragm drive unit 308 is driven based on silent speed information, the drive based on silent speed information is not limited to the case described in the above-described embodiment. Silent speed information can be used when the drive unit needs to be driven with its drive sound being suppressed to a low level. For example, control based on silent speed information may be performed according to the shooting environment. Specifically, control based on silent speed information may be performed when environmental sound is recognized (e.g., whether the surroundings of the digital camera 1 are noisy or silent) and based on the recognized environmental sound it is determined whether the digital camera 1 is inside or outside.

Although in the present embodiment the CMOS sensor 201 is used as an imaging unit, the imaging unit can be of any configuration as long as the imaging unit can image a subject image and can thereby generate image data (a digital signal or electrical signal). That is, although the camera body 2 includes the CMOS sensor 201 including a light-receiving element, an AGC, and an AD converter, the configuration is not limited thereto; for example, the camera body 2 may include a CCD image sensor and an AD converter that are configured by different members. Note that when the imaging unit is configured by the CMOS sensor 201, power consumption can be reduced.

In the above-described embodiment, the "control signal for controlling the diaphragm drive unit 308" includes an aperture value (f-number) and a drive speed of the diaphragm drive unit 308. However, the configuration is not limited thereto; for example, instead of an aperture value, a drive amount of the diaphragm drive unit 308 may be included. Alternatively, by using addresses corresponding to an aperture value and a drive speed, information on the aperture value and the drive speed may be included in a control signal.

The above-described embodiment describes an example of using silent speed information indicating a setting value related to a silent operation of the drive unit. However, the configuration is not limited thereto and the interchangeable lens 3 may send silent speed information indicating an allowable setting range. In this case, the allowable setting range is not particularly limited but, for example, information such as 70 to 90 AV/sec can be sent as an allowable setting range. At this time, when the drive unit is caused to operate with its drive sound being suppressed, the camera body 2 may generate a control signal based on the allowable setting range and send the control signal to the interchangeable lens 3. For example, when the drive unit is caused to operate with its drive sound being suppressed, the camera body 2 determines a drive speed using values included in the allowable setting range and generates a control signal. By doing so, a setting width can be made for the drive speed, and accordingly, the digital camera 1 can drive the drive unit (diaphragm drive unit 308) at an optimal speed, taking account of the appearance of a moving image to be shot and so on, while maintaining a silent operation.

Although the present embodiment describes the case in which the imaging apparatus is a digital still camera, the imaging apparatus is not limited thereto and the present embodiment can also be applied to a digital video camera.

INDUSTRIAL APPLICABILITY

The present embodiment has an advantageous effect that a drive unit of an interchangeable lens can be operated with a reduced drive sound of the drive unit of the interchangeable lens, and thus is useful for a digital still camera or digital video camera with an audio recording function.

Although the present embodiment has been described in connection with specified embodiments thereof, many other modifications, corrections and applications are apparent to those skilled in the art. Therefore, the present embodiment is not limited by the disclosure provided herein but limited only to the scope of the appended claims. The present disclosure relates to subject matter contained in Japanese Patent Application No. 2008-116805, filed on Apr. 28, 2008, which is expressly incorporated herein by reference in its entirety.

What is claimed is:

1. A camera body to which an interchangeable lens is mountable, the interchangeable lens including an optical member operable to change an optical condition and a drive unit operable to drive the optical member at a drive speed within a predetermined range, the camera body comprising:
   a receiving unit operable to receive silent speed information from the interchangeable lens, the silent speed information indicating a setting value or an allowable setting range related to a silent operation of the drive unit, the setting value and the allowable setting range being a value and a range of the drive speed within the predetermined range, respectively; and
   a controller operable to generate a control signal for driving the drive unit based on the received silent speed information and send the generated control signal to the interchangeable lens for driving the drive unit at a low drive sound level,
   wherein the drive unit is driven at the low drive sound level when the camera body is performing an audio recording operation.

2. The camera body according to claim 1, further comprising silent mode for a situation where a drive sound of the drive unit is desired to be at a low level, wherein
   the drive unit is driven at the low drive sound level when the camera body is set to the silent mode during performing the audio recording operation.

3. The camera body according to claim 1, wherein the setting value related to the silent operation of the drive unit is a value of the drive speed at which the drive sound level is less than both drive sound levels of the drive unit generated when driving the optical member at a maximum value and a minimum value of drive speeds within the predetermined range, respectively.

4. The camera body according to claim 1, wherein:
   the receiving unit is operable to receive highest-speed information indicating a highest speed operation of the drive unit and lowest-speed information indicating a lowest speed operation of the drive unit; and
   the controller is operable to generate control signals for driving the drive unit based on the received highest-speed information and lowest-speed information, and send the generated control signals to the interchangeable lens for driving the drive unit at the highest speed operation and the lowest speed operation.

5. The camera body according to claim 4, wherein the setting value or allowable setting range related to the silent speed operation of the drive unit is between setting values or allowable setting ranges of the highest speed operation and lowest speed operation of the drive unit.

6. An interchangeable lens mountable to a camera body comprising:
an optical member operable to change an optical condition;
a drive unit operable to drive the optical member at a drive speed within a predetermined range;
a storage unit operable to store silent speed information indicating a setting value or an allowable setting range related to a silent operation of the drive unit, the setting value and the allowable setting range being a value and a range of the drive speed within the predetermined range, respectively; and
a sending unit operable to read the silent speed information stored in the storage unit and send the silent speed information to the camera body; and
a controller operable to receive, from the camera body, a control signal for driving the drive unit at a low drive sound level which is generated according to the silent speed information, and control the drive unit according to the received control signal,
wherein the drive unit is driven at the low drive sound level when the camera body is performing an audio recording operation.

7. The interchangeable lens according to claim 6, wherein the optical member includes at least one of a zoom lens, a focus lens or a diaphragm.

8. The interchangeable lens according to claim 6, wherein the setting value related to the silent operation of the drive unit is a value of the drive speed at which a drive sound level is less than both drive sound levels of the drive unit generated when driving the optical member at a maximum value and a minimum value of drive speeds within the predetermined range, respectively.

9. The interchangeable lens according to claim 6, wherein:
the storage unit is operable to store highest-speed information indicating a highest speed operation of the drive unit and lowest-speed information indicating a lowest speed operation of the drive unit;
the sending unit is operable to read the highest-speed information and lowest-speed information stored in the storage unit and send the highest-speed information and lowest-speed information to the camera body; and
the controller is operable to receive, from the camera body, control signals for driving the drive unit which is generated according to the highest-speed information and lowest-speed information, and control the drive unit according to the received control signals.

10. The interchangeable lens according to claim 9, wherein the setting value or allowable setting range related to the silent speed operation of the drive unit is between setting values or allowable setting ranges of the highest speed operation and lowest speed operation of the drive unit.

11. An imaging apparatus comprising:
a camera body; and
an interchangeable lens mountable to the camera body, wherein
the interchangeable lens includes:
an optical member operable to change an optical condition;
a drive unit operable to drive the optical member at a drive speed within a predetermined range;
a storage unit operable to store silent speed information indicating a setting value or an allowable setting range related to a silent operation of the drive unit, the setting value and the allowable setting range being a value and a range of the drive speed within the predetermined range, respectively; and
a first controller operable to read the silent speed information stored in the storage unit and send the silent speed information to the camera body,
the camera body includes:
a receiving unit operable to receive the silent speed information from the interchangeable lens; and
a second controller operable to generate a control signal for driving the drive unit based on the received silent speed information, and send the generated control signal to the interchangeable lens for driving the drive unit at a low drive sound level,
wherein the first controller of the interchangeable lens receives the control signal from the camera body and controls the drive unit according to the received control signal, and
the drive unit is driven at the low drive sound level when the camera body is performing an audio recording operation.

12. The imaging system according to claim 11, wherein:
the storage unit is operable to store highest-speed information indicating a highest speed operation of the drive unit and lowest-speed information indicating a lowest speed operation of the drive unit;
the first controller is operable to read the highest-speed information and lowest-speed information stored in the storage unit and send the highest-speed information and lowest-speed information to the camera body;
the receiving unit is operable to receive the highest-speed information and the lowest-speed information from the interchangeable lens; and
the second controller is operable to generate control signals for driving the drive unit based on the received highest-speed information and lowest-speed information, and send the generated control signals to the interchangeable lens for driving the drive unit at the highest speed operation and the lowest speed operation.

13. The imaging system according to claim 12, wherein the setting value or allowable setting range related to the silent speed operation of the drive unit is between setting values or allowable setting ranges of the highest speed operation and lowest speed operation of the drive unit.

* * * * *

UNITED STATES PATENT AND TRADEMARK OFFICE
CERTIFICATE OF CORRECTION

| | | |
|---|---|---|
| PATENT NO. | : 8,253,823 B2 | Page 1 of 1 |
| APPLICATION NO. | : 12/429765 | |
| DATED | : August 28, 2012 | |
| INVENTOR(S) | : Koji Shibuno, Takashi Abe and Koji Hashigami | |

It is certified that error appears in the above-identified patent and that said Letters Patent is hereby corrected as shown below:

Column 12, Lines 46-47, related to Claim 8,
    "The camera body according to claim 1, further comprising silent mode..." should read
    --The camera body according to claim 1, further comprising a silent mode...--

Signed and Sealed this

Thirteenth Day of November, 2012

David J. Kappos
*Director of the United States Patent and Trademark Office*

UNITED STATES PATENT AND TRADEMARK OFFICE
CERTIFICATE OF CORRECTION

PATENT NO. : 8,253,823 B2  
APPLICATION NO. : 12/429765  
DATED : August 28, 2012  
INVENTOR(S) : Koji Shibuno, Takashi Abe and Koji Hashigami Page 1 of 1

It is certified that error appears in the above-identified patent and that said Letters Patent is hereby corrected as shown below:

Column 12, Lines 46-47, related to Claim 2,
"The camera body according to claim 1, further comprising silent mode..." should read
--The camera body according to claim 1, further comprising a silent mode...--

This certificate supersedes the Certificate of Correction issued November 13, 2012.

Signed and Sealed this
Nineteenth Day of March, 2013

Teresa Stanek Rea
*Acting Director of the United States Patent and Trademark Office*